United States Patent [19]

Camp et al.

[11] 3,729,407
[45] Apr. 24, 1973

[54] HYDROGENATION PROCESS UTILIZING RECOVERED CATALYST

[75] Inventors: Frederick W. Camp, West Chester; Frederic S. Eisen, Broomall; James Van Dyck Fear, West Chester; Merritt C. Kirk, Jr., Thornton; all of Pa.

[73] Assignee: Sun Oil Company of Pennsylvania, Philadelphia, Pa.

[22] Filed: Ap. 5, 1971

[21] Appl. No.: 131,336

[52] U.S. Cl. .....................208/10, 208/112, 252/416
[51] Int. Cl. ..............................................C10g 1/06
[58] Field of Search................................208/112, 10; 252/416

[56] References Cited

UNITED STATES PATENTS

| | | |
|---|---|---|
| 1,963,517 | 6/1934 | Burk.....................................208/112 |
| 2,012,318 | 8/1935 | Pfirrmann ...............................208/10 |
| 2,355,831 | 8/1944 | Voorhies..............................252/416 |
| 2,769,687 | 11/1956 | Porter et al...........................252/416 |
| 3,152,063 | 10/1964 | Schroeder et al. ......................208/10 |
| 3,502,564 | 3/1970 | Hodgson ................................208/10 |

Primary Examiner—Delbert E. Gantz
Assistant Examiner—Veronica O'Keefe
Attorney—George L. Church, Donald R. Johnson, Wilmer E. McCorquodale, Jr. and Paul Lipsitz

[57] ABSTRACT

In a hydrogenation process where molybdenum oxide or sulfide is used as catalyst, the improvement of condensing vapors of recovered catalyst in the feed stream to the hydrogenation unit.

5 Claims, 1 Drawing Figure

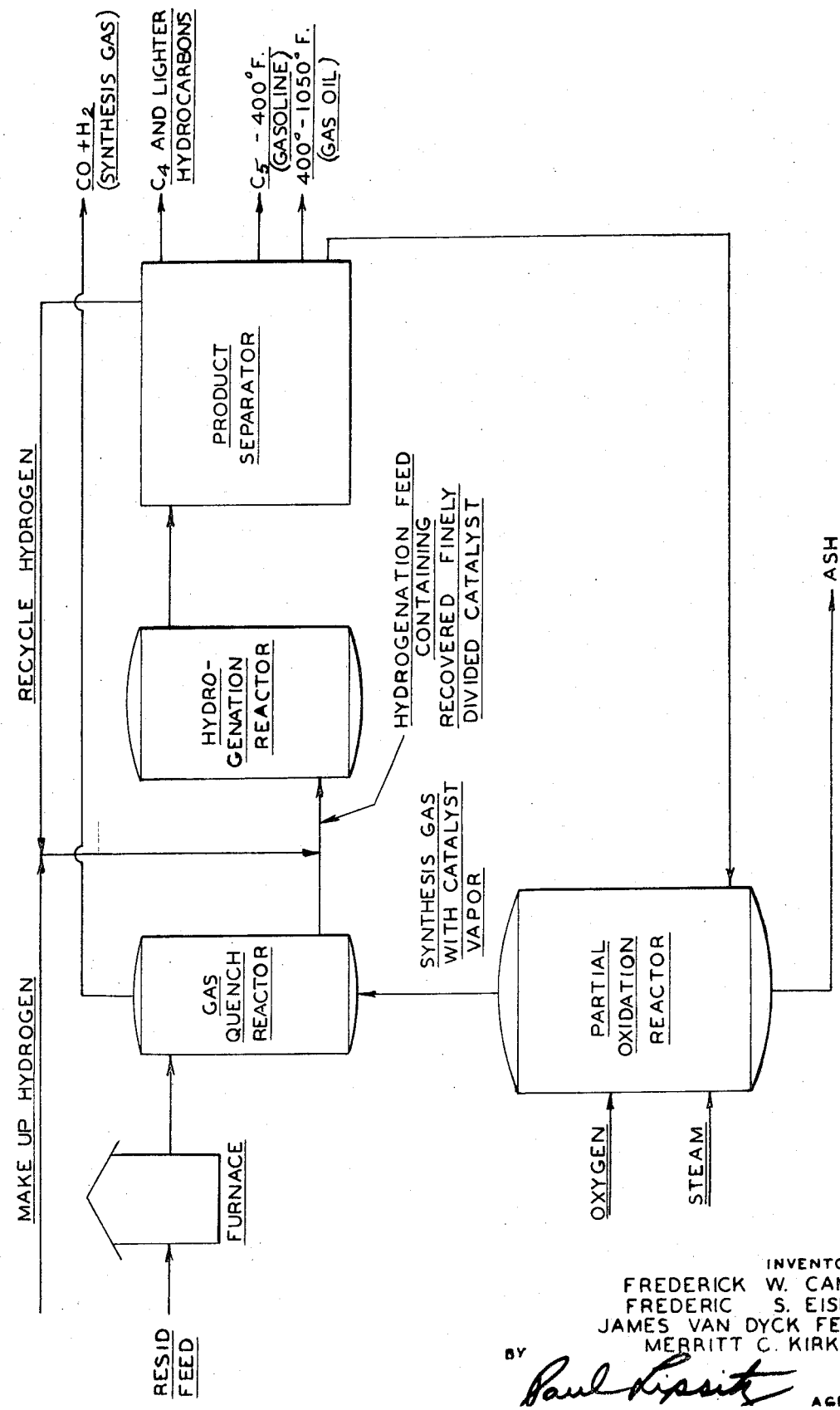

HYDROGENATION PROCESS UTILIZING RECOVERED CATALYST

Hydrogenation of petroleum products, coal and coal products with metal oxide catalysts are well-known processes. For example, it is known to upgrade petroleum residues by hydrogenation to more valuable distillate products of reduced sulfur, nitrogen, and heavy metals content. In such processes catalysts are used and metal oxides or sulfides of Group VI and VIII metals are preferred catalysts. Of these catalysts, molybdenum oxide, generally on a support, and either alone or promoted with nickel, cobalt, chromium or another metal has been a particularly valuable hydrogenation catalyst. However, when feeds high in sulfur, nitrogen and heavy metals are so treated, the catalyst is often rapidly deactivated. This results in high process costs because of the need for makeup catalyst and/or for more frequent regeneration.

This invention provides an improved hydrogenation process employing a molybdenum hydrotreating catalyst whereby problems generally associated with such processes are alleviated. In accord with the invention, a hydrogenation process is provided where an unsupported molybdenum oxide or sulfide catalyst is employed in the system, said catalyst being separated from volatile hydrogenation products resulting from the process, regenerating and vaporizing said catalyst, and condensing the vapors in the feed stream to the hydrogenation process. In a preferred embodiment of the invention, the recovered catalyst is regenerated and vaporized by feeding it with steam and oxygen to a partial oxidation reactor operating at a temperature from about 1,500° to about 3,000°F. and pressure is from 0 to about 3,000 p.s.i.g., where any hydrocarbons in the feed stream are also converted primarily to CO and hydrogen, the catalyst thus being regenerated to $MoO_3$ and volatilized.

By means of this invention high catalytic activity in the hydrogenation process is achieved and an efficient low-cost regeneration procedure is obtained. Furthermore, because the catalyst is unsupported and constantly removed from the system by vaporization, pore plugging is avoided, such plugging often causing rapid deactivation of supported metal catalysts in hydrogenation processes.

The invention will be illustrated by its use in the upgrading of a petroleum resid and reference is now made to the drawing which will aid in understanding the process. The resid feed is heated to a temperature of about 625°F. to about 675°F. in a furnace and passed to the Gas Quench Reactor where regenerated, vaporized catalyst is condensed to solid $MoO_3$. Volatile gases present, such as synthesis gas, are taken overhead as a valuable by-product and it will be understood that this gas can be scrubbed of $H_2S$ and shifted with water to form hydrogen for use in the Hydrogenation Reactor. The condensed catalyst together with liquid resid feed and added hydrogen is then conducted to the Hydrogenation Reactor where hydrogenation occurs at temperatures between about 780° to 850°F. for a 0.5 to 4 hour reaction time. Hydrogen pressure in the reactor is generally 1,000 to 5,000 p.s.i.g. The volatile hydrogenation products, unreacted feed, and spent catalyst are taken overhead to a Product Separator and are separated in the conventional manner, preferably vacuum flashing to yield various product streams such as $C_4$ and lighter hydrocarbons (e.g., wet gas), $C_5$ hydrocarbons (gasoline), and higher boiling products such as gas oil (400° to 1,050°F.). The residual stream from the separator contains unconverted feed material, the molybdenum catalyst, and all non-volatile feed impurities, including heavy metals (vanadium, nickel, and iron compounds which were in the feed). This residual stream is fed, together with oxygen and steam to a Partial Oxidation Reactor. This reactor operates at about 1,500° to 2,700°F. and at about 0 to 3,000 p.s.i.g., and converts the spent catalyst to molybdenum oxide. Also in this reactor, hydrocarbonaceous material is converted primarily to CO and hydrogen and/or water and the heavy metals present are largely converted to their oxides, which unwanted heavy metal oxides are readily removed as ash since the oxides present other than $MoO_3$ do not appreciably vaporize.

It will be understood that sublimation of the $MoO_3$ will occur in the off gas stream from the Partial Oxidation Reactor when the vapor pressure of $MoO_3$ exceeds the partial pressure of $MoO_3$ in this stream and such condition will be met under the conditions of the process. Thus, for example, at a pressure of 700 psia, reaction temperature should be at least about 2,100°F. for significant sublimation of $MoO_3$ to occur, while at 350 psia, significant sublimation will occur at about 1,980°F. or higher. Thus, under these reaction conditions, the vapors of the catalyst together with the synthesis gas formed is taken overhead to the Gas Quench Reactor where the catalyst is condensed and intimately mixed with the resid feed. It will be understood that during the hydrogenation process at least some of the molybdenum oxide is converted to sulfide, but both forms are catalytically active and recovered as set forth above.

The Gas Quench Reactor serves further to partially preheat the resid feed which enables the furnace to operate at a lower temperature with less fouling problems.

Table I which follows indicates material balance and product quality typical of the above described procedure.

TABLE I.—MATERIAL BALANCE AND PRODUCT QUALITY

| | Inputs | | | | Outputs | | | | | Internal streams | |
|---|---|---|---|---|---|---|---|---|---|---|---|
| Rate | Residual feed | $H_2$ | $O_2$ | Steam | $C_4$- wet gas | $C_5$- 400° F. | 400-1050° F., gas, oil | Quench gas | Ash | 1050° F. plus vac. btms. | Part. ox. reactor off gas |
| B./s.d [1] | 10,000 | | | | [2] 430 | 2,730 | 7,200 | | | 820 | |
| Lb./hr. (×1,000) | 146.1 | 3.4 | 11 | 5.74 | 8.36 | 30.2 | 100 | 27.58 | .083 | 12.25 | 33.86 |
| Mm. s.c.f./d | | 15.5 | | | | | | 15.5 | | | |
| Inspections: | | | | | | | | | | | |
| °API | 10 | | | | [3] 50 | [4] 20 | | | | 8 | |
| Distillation, IBP: | | | | | | | | | | | |
| | ([7]) | | | | 120 | 400 | | | | | |
| 50% | | | | | | | | | | | |
| 95% | | | | | 400 | 1,050 | | | | | |

Table I — Continued — MATERIAL BALANCE AND PRODUCT QUALITY

| | Inputs | | | | Outputs | | | | Internal streams | |
|---|---|---|---|---|---|---|---|---|---|---|
| Rate | Residual feed | $H_2$ | $O_2$ | Steam | $C_4-$ wet gas | $C_5-$ 400° F. | 400-1050° F., gas, oil | Quench gas | Ash | 1050° F. plus vac. btms. | Part. ox. reactor off gas |
| Sulfur, wt. percent | 3.09 | | | | | | 0.82 | | | 1.22 | |
| Nitrogen, wt. percent | 0.54 | | | | | | 0.245 | | | | |
| Con. carbon | 15.3 | | | | | | | | | | |
| V+Ni+Fe, p.p.m. | 600 | | | | | 0 | <2 | | | | |
| Composition, vol. percent: | | | | | | | | | | | |
| $H_2$ | | 100 | | | | | | 51.3 | | | 48 |
| CO | | | | | | | | 43.4 | | | 40.6 |
| $CO_2$ | | | | | | | | 5.3 | | | 5.1 |
| $H_2S$ | | | | | [6] 51 | | | | | | |
| Mo, wt. percent as metal | | | | | | | | | | [5] 19.1 | |

[1] Barrels per stream day.
[2] Fuel oil equivalent.
[3] Calc. 39.2 °API: Volume yield may be low.
[4] Calc. 16.9 °API: Volume yield may be low.
[5] 2 wt. percent residual feed.
[6] Weight percent.
[7] 72% greater than 1,050° F.

Another application of the invention is in the fluidized bed hydrogenation of coal. Here the molybdenum oxide catalyst is intimately contacted in a fluid bed hydrogenator with the comminuted coal by deposition of the condensing catalyst on the coal surface. The residual solids of char-catalyst combination are subsequently separated from volatile products and returned to a gasifier which is fed also with steam and oxygen where regeneration and sublimation of the molybdenum oxide occurs. The vapors of catalyst and other volatiles are then fed into the fluidized bed which is at an appropriate pressure (say from about 0 to 2,000 p.s.i.g.) and at a temperature below the sublimation temperature of the catalyst, thereby effecting its condensation on the fluidized bed of comminuted coal.

It will be understood that numerous changes and variations may be made from the above description and illustrative examples without departing from the spirit and scope of the invention.

The invention claimed is:

1. In the process of hydrogenating a feed of a petroleum or coal product where an unsupported molybdenum oxide or sulfide is used as catalyst, the improvement which comprises separating spent catalyst from volatile hydrogenation products resulting from the process, regenerating and vaporizing said catalyst by oxidation at a temperature of from about 1,500° to about 3,000°F and at from 0 to 3,000 psig, and condensing the vapors of said regenerated catalyst in the feed stream to the hydrogenation process.

2. The process of claim 1 where the feed stream is a petroleum resid.

3. The process of claim 1 where vapors of recovered catalyst are condensed on a fluidized bed of comminuted coal.

4. A process for treating a petroleum resid comprising the steps of:
   a. hydrogenating in a hydrogenation unit a liquid resid feed intimately mixed with finely divided, unsupported molybdenum oxide catalyst,
   b. separating a residual stream containing spent catalyst from volatile hydrogenation products,
   c. feeding said residual stream together with steam and oxygen to a partial oxidation reactor operated at about 1,500° to 2,700°F. where hydrocarbons are converted primarily to CO and $H_2$ and where said molybdenum catalyst is regenerated to $MoO_3$ and said $MoO_3$ is vaporized,
   d. quenching the exit gases from said partial oxidation reactor with liquid reside feed to condense vaporized $MoO_3$ to solid $MoO_3$, and
   e. feeding the resulting liquid resid containing intimately mixed $MoO_3$ to said hydrogenation unit.

5. A process for treating coal comprising the steps of:
   a. hydrogenating comminuted coal in a fluidized bed hydrogenation unit employing as catalyst finely divided molybdenum oxide deposited on the surface of said coal,
   b. separating residual solids of char-catalyst combination from volatile hydrogenation products,
   c. feeding said residual solids together with steam and oxygen to a partial oxidation reactor operated at about 1,500° to 3,000°F. where hydrocarbons are converted primarily to CO and $H_2$ and where said molybdenum catalyst is regenerated to $MoO_3$ and said $MoO_3$ is vaporized, and
   d. feeding the exit gases from said partial oxidation reactor to said hydrogenation unit to condense said vaporized $MoO_3$ on the surface of said coal.

* * * * *